US011095578B2

(12) United States Patent
Jones et al.

(10) Patent No.: US 11,095,578 B2
(45) Date of Patent: Aug. 17, 2021

(54) TECHNOLOGY FOR CHAT BOT TRANSLATION

(71) Applicant: International Business Machines Corporation, Armonk, NY (US)

(72) Inventors: Steven Ware Jones, Astoria, NY (US); Ruchi Asthana, New York, NY (US); Jennifer A. Mallette, Vienna, VA (US); Jacob Lewis, New York City, NY (US); Vivek Salve, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/711,373

(22) Filed: Dec. 11, 2019

(65) Prior Publication Data

US 2021/0184995 A1    Jun. 17, 2021

(51) Int. Cl.
*G10L 17/22*   (2013.01)
*G06F 8/35*   (2018.01)
(Continued)

(52) U.S. Cl.
CPC .............. *H04L 51/02* (2013.01); *G06F 40/47* (2020.01); *G06F 40/58* (2020.01); *G06N 20/00* (2019.01)

(58) Field of Classification Search
CPC ... G10L 15/063; G10L 15/16; G10L 15/1815; G06N 3/08; G06N 20/00; H04L 51/02;
(Continued)

(56) References Cited

U.S. PATENT DOCUMENTS 8,924,195 B2   12/2014 Kamatani et al.
9,208,149 B2   12/2015 Tanaka
(Continued)

FOREIGN PATENT DOCUMENTS

WO    2019000170 A1    1/2019

OTHER PUBLICATIONS

Bornstein, A. (Jan. 2017). Building LUIS models for unsupported languages with machine translation. DEVEL0PER B10G, Microsoft. Retrieved from https://www.microsoft.com/developerblog/2017/01/14/building-luis-models-for-unsupported-languages-with-machine-translation/.
(Continued)

*Primary Examiner* — Nicholas R Taylor
*Assistant Examiner* — Christopher B Robinson
(74) *Attorney, Agent, or Firm* — Anthony V. S. England; Reza Sarbakhsh; Susan M. Maze

(57) ABSTRACT

For a chat bot, first intent data is provided, including a first instance of sample utterances in a first natural language and intents corresponding to the respective sample utterances. The sample utterances are translated by a computer system to a second natural language as a second instance of the sample utterances. The sample utterances of the second instance are translated by a computer system back to the first natural language as a third instance of the sample utterances. Second intent data is provided including the third instance of the sample utterances and the corresponding intents. An intent classifier of the chat bot is trained to identify respective intents of real time utterances, wherein the identifying is responsive to the intent classifier receiving the real time utterances from a user when the chat bot is in an operating mode and the training includes training the intent classifier on the first and second intent data.

17 Claims, 7 Drawing Sheets

(51) Int. Cl.
  G06F 8/30 (2018.01)
  G10L 15/22 (2006.01)
  H04L 12/58 (2006.01)
  G06N 20/00 (2019.01)
  G06F 40/47 (2020.01)
  G06F 40/58 (2020.01)
(58) Field of Classification Search
  CPC ....... H04L 67/141; H04L 67/02; H04L 67/26; H04L 67/32; G06F 40/205; G06F 40/47; G06F 40/58; G06F 16/986; G16H 10/60
  See application file for complete search history.

(56) References Cited

U.S. PATENT DOCUMENTS

| | | | | |
|---|---|---|---|---|
| 2005/0228636 | A1* | 10/2005 | Erhart | G06F 40/58 704/2 |
| 2012/0166183 | A1* | 6/2012 | Suendermann | G06F 40/58 704/9 |
| 2015/0347399 | A1 | 12/2015 | Aue | |
| 2018/0052826 | A1 | 2/2018 | Chowdhary | |
| 2018/0232662 | A1* | 8/2018 | Solomon | G06F 3/0304 |
| 2018/0276201 | A1* | 9/2018 | Choi | G06N 3/0454 |
| 2019/0103095 | A1* | 4/2019 | Singaraju | H04L 51/04 |
| 2019/0103111 | A1* | 4/2019 | Tiwari | G06F 16/3334 |
| 2019/0188324 | A1 | 6/2019 | Zhao et al. | |
| 2020/0320984 | A1* | 10/2020 | Kuczmarski | G10L 15/1822 |

OTHER PUBLICATIONS

Ranzato, M.'A., Lample, G., & Ott, M. (Aug. 2018). Unsupervised machine translation: A novel approach to provide fast, accurate translations for more languages. NLP Research, Artificial Intelligence, Facebook. Retrieved from https://ai.facebook.com/blog/unsupervised-machine-translation-a-novel-approach-to-provide-fast-accurate-translations-for-more-languages.

Turner, Steve, "Create a translator bot using Amazon Translate and Amazon Lex," Aug. 22, 2018, https://aws.amazon.com/blogs/machine-learning/create-a-translator-chatbot-using-amazon-translate-and-amazon-lex.

Chawla, Harpreet Kaur, "Translate Watson Conversation Chat Bots," Oct. 30, 2017, https://www.ibm.com/cloud/blog/translate-watson-conversation-chatbots.

Sennrch, Rico, et al., "Improving Neural Machine Translation Models with Monolingual Data," Proceedings o/the 54th Annual Meeting o/the Association/or Computational Linguistics, pp. 86-96, Berlin, Germany, Aug. 7-12, 2016, https://aclweb.org/anthology/P16-1009.

* cited by examiner

TECHNOLOGY FOR CHAT BOT TRANSLATION

BACKGROUND

A "chat bot" function may be provided by a program running on a computer system to simulate a human conversation with a user, i.e., a "chat," via an interface of the computer system. In one implementation, the chat proceeds in a fixed pattern of turn taking, wherein the chat bot generates a prompt to the user from a very limited set of potential prompts and then waits to generate a reply in response to a user input, referred to herein as a user "utterance" which may be text-based or voice-based, depending on the implementation. In other words, after the initial prompt, the chat generally proceeds in a fashion: user, chat bot, user, chat bot, etc.

SUMMARY

A computer system implemented method for a chat bot includes providing first intent data that includes a first instance of sample utterances in a first natural language and intents corresponding to the respective sample utterances. The sample utterances are translated by a computer system to a second natural language as a second instance of the sample utterances. The sample utterances of the second instance are translated by a computer system back to the first natural language as a third instance of the sample utterances. Second intent data is provided including the third instance of the sample utterances and the corresponding intents. An intent classifier of the chat bot is trained to identify respective intents of real time utterances, wherein the identifying is responsive to the intent classifier receiving the real time utterances from a user when the chat bot is in an operating mode and the training includes training the intent classifier on the first and second intent data.

In other embodiments of the invention, other forms are provided, including a system and a computer program product.

BRIEF DESCRIPTION OF THE DRAWINGS

Features and advantages of the present invention will be more readily understood with reference to the attached figures and following description, wherein.

DETAILED DESCRIPTION

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
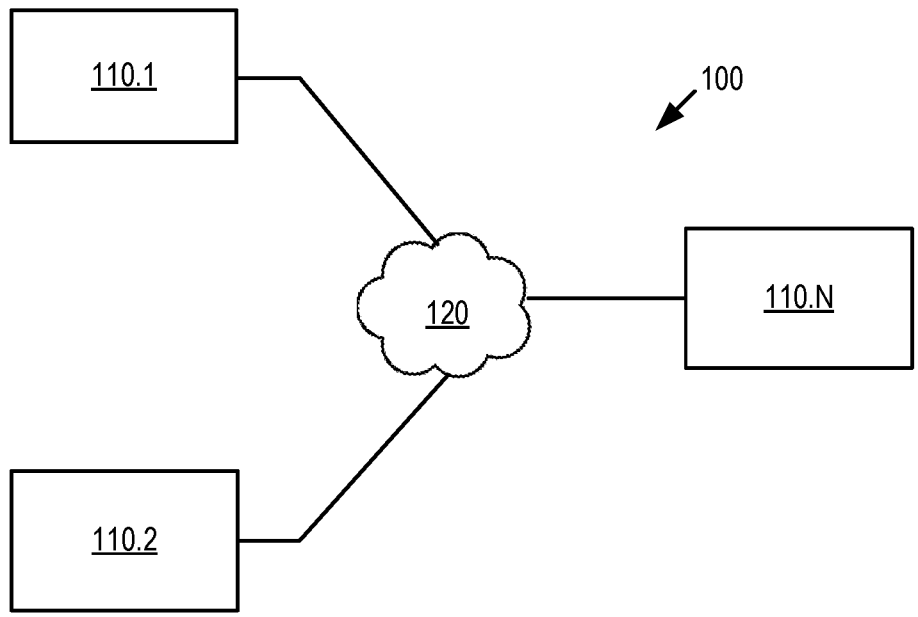
FIG. 1 illustrates a networked computer environment, according to embodiments of the present invention.

FIG. 1 illustrates an example computing environment 100, according to embodiments of the present invention. As shown, computing environment 100 includes computer systems 110.1, 110.2 through 110.N connects via network 120, which may be a public or private network. Systems 110.1, 110.2, etc. include modules, which may be program or hardware modules, configured to perform tasks for their own respective systems or for other systems or both, including tasks as described for elements of FIGS. 2 through 8 herein.

Figure 2:
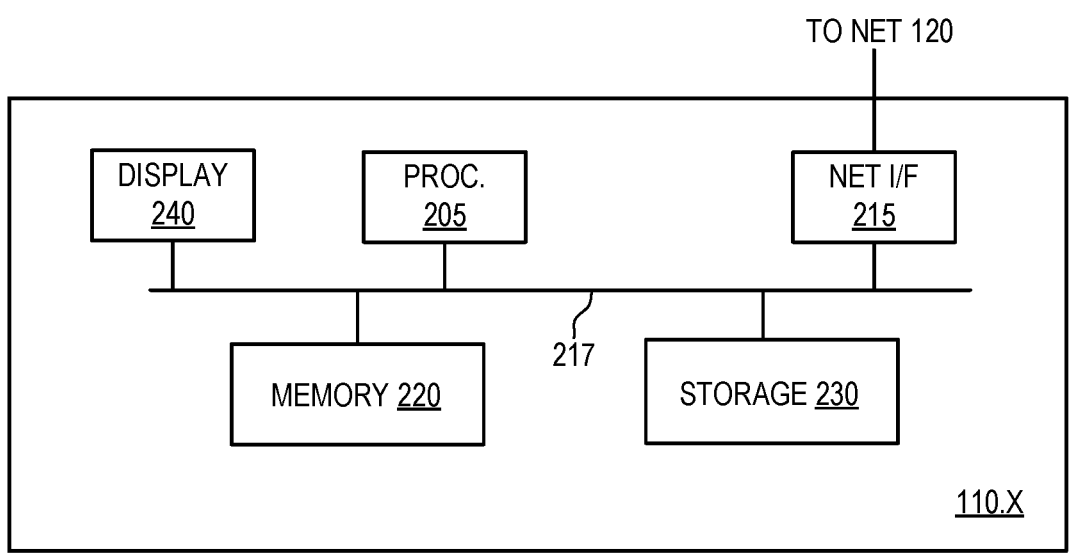
FIG. 2 is a block diagram of computer systems shown in FIG. 1, according to embodiments of the present invention.

FIG. 2 illustrates details of a computer system 110.X suitable as computer systems 110.1, 110.2, etc. according to embodiments of the present invention, wherein system 110.X includes at least one central processing unit (CPU) 205, network interface 215, interconnect (i.e., bus) 217, memory 220, storage device 230 and display 240. CPU 205 may retrieve and execute programming instructions stored in memory 220 for applications. Similarly, CPU 205 may retrieve and store application data residing in memory 220. Interconnect 217 may facilitate transmission, such as of programming instructions and application data, among CPU 205, storage 230, network interface 215, and memory 220. CPU 205 is representative of a single CPU, multiple CPUs, a single CPU having multiple processing cores, and the like. Additionally, memory 220 is representative of a random-access memory, which includes data and program modules for run-time execution. It should be understood that system 110.X may be implemented by other hardware and that one or more modules thereof may be firmware.

Figure 3:
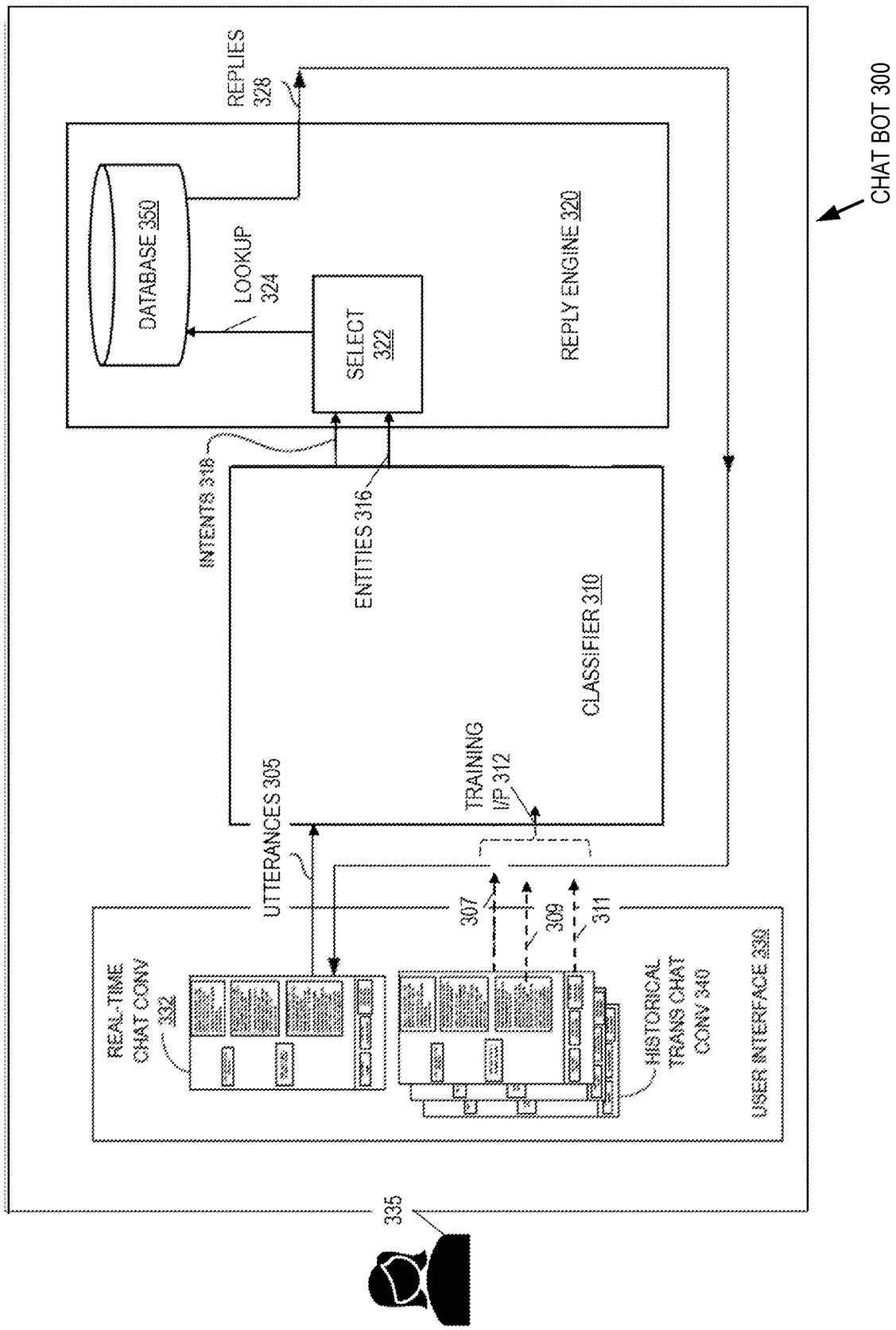
FIG. 3 illustrates a computer system implemented chat bot, according to embodiments of the present invention.

Referring now to FIG. 3, a chat bot 300 is illustrated, according to an embodiment of the present invention. Chat bot application 300 includes a classifier 310 and a reply engine 320. When in an operational mode, chat bot application 300 receives user 335 utterances 305, (e.g., requests, statements and questions) in real time conversation 332 via user interface 330 and inputs utterances 305 to classifier 310, which responsively classifies utterances 305 into respective intentions 318 and entities 319. Select logic 322 of reply engine 320 receives intentions 318 and entities 319 from classifier 310, responsively generates a lookup command 324, which logic 322 sends to database 350 to retrieve replies 328, where each reply 328 is associated with a corresponding intent 318 and may also be associated with an entity 319. In this manner, engine 320 provides respective replies 328 to user 335 in real time conversation 332 via interface 330 responsive to utterances 305. (Regarding the origin of replies 328, when chat bot 300 was initially trained in the first language, replies 328 (in the first natural language) corresponding to respective intents 309 or entities 311 or both were generated by an analyst and stored in database 350.)

Chat bots are commonly implemented within limited conversational domains, because the larger the domain of a chat bot, the greater the required training. For a conversational domain of any substantial significance, it is generally a significant undertaking to provide enough training data for the chat bot. (Herein, the term "chat bot" may refer to a chat bot program or a method performed by the program, according to embodiments of the present invention. In an embodiment, the chat bot may include the program and the computer system it runs on. In one embodiment, the chat bot may also include a network between the computer system and may include a program running on a computer system of the user. In one embodiment, the chat bot may also include the computer system of the user.)

Training classifier 310 of chat bot 300, in an embodiment of the present invention, involves obtaining historical user utterances 307 of historical chats 340 and manually classifying and tagging, i.e., labeling, each historical utterance 307 to indicate a corresponding intention 309 underlying utterance 307 or an entity 311 stated or implied in utterance 307, or both, where an entity 311 may be the name or type of a product or service, for example. As a further example, input from user 335 may include a question that a human analyst who reviews the input captures as an utterance 307, such as "What's the price?" The analyst may tag this utterance 307 with an intent 309, "detailed price," for example. In a still further example, input from user 335 may include a portion, "most expensive license," that an analyst captures as an utterance 307 and tags with an entity 311 classification such as "premium license."

The analyst then provides a set of utterances 307 and corresponding intentions 309 and a set of utterances and corresponding entities 311 as training data for supervised training of classifier 310. It should be appreciated that many tagged utterances 307 are required to train classifier 310 for a significant conversation domain, and that manually classifying and tagging many utterances 307 is a significant and challenging undertaking.

The challenge of providing training data for chat bot 300 is compounded since chat bot 300 may be provided for more than one natural language. For deploying chat bot 300 to a second natural language, one possible approach is to simply develop a new instance of chat bot 300 in in the second natural language, which includes providing a new set of training data in the second natural language. This can be done by either capturing historical utterances in the second natural language and manually tagging them with intents, or else manually translating the utterances of the existing training data from the first to the second natural language. It is a significant undertaking to provide a new set of training data either of these ways, because of the voluminous amount required for any substantial conversational domain and because the record contains subtleties that are hard to capture with mass-translation, even when the translation is done manually.

Alternatively, an arrangement is known in which a chat bot that was trained in the first natural language has been deployed for use in the second natural language, i.e., without re-training. According to this alternative, user utterances in the second natural language are machine translated in real time from the second natural language into the first natural language and then sent in real time to the chat bot trained in the first natural language. Then, replies in the first natural language are translated back into the second natural language. While this requires less time and effort to get a chat bot up and running for use in the second natural language, replies of the chat bot program to the machine-translated user utterances have proven to be poor due to a combination of at least two factors. First, classification suffers for the translated utterances presented in the first natural language to the intent classifier of the chat bot. This is compounded by any deficiencies in translation to the second natural language of replies that the chat bot generates in the first language.

Figure 4:
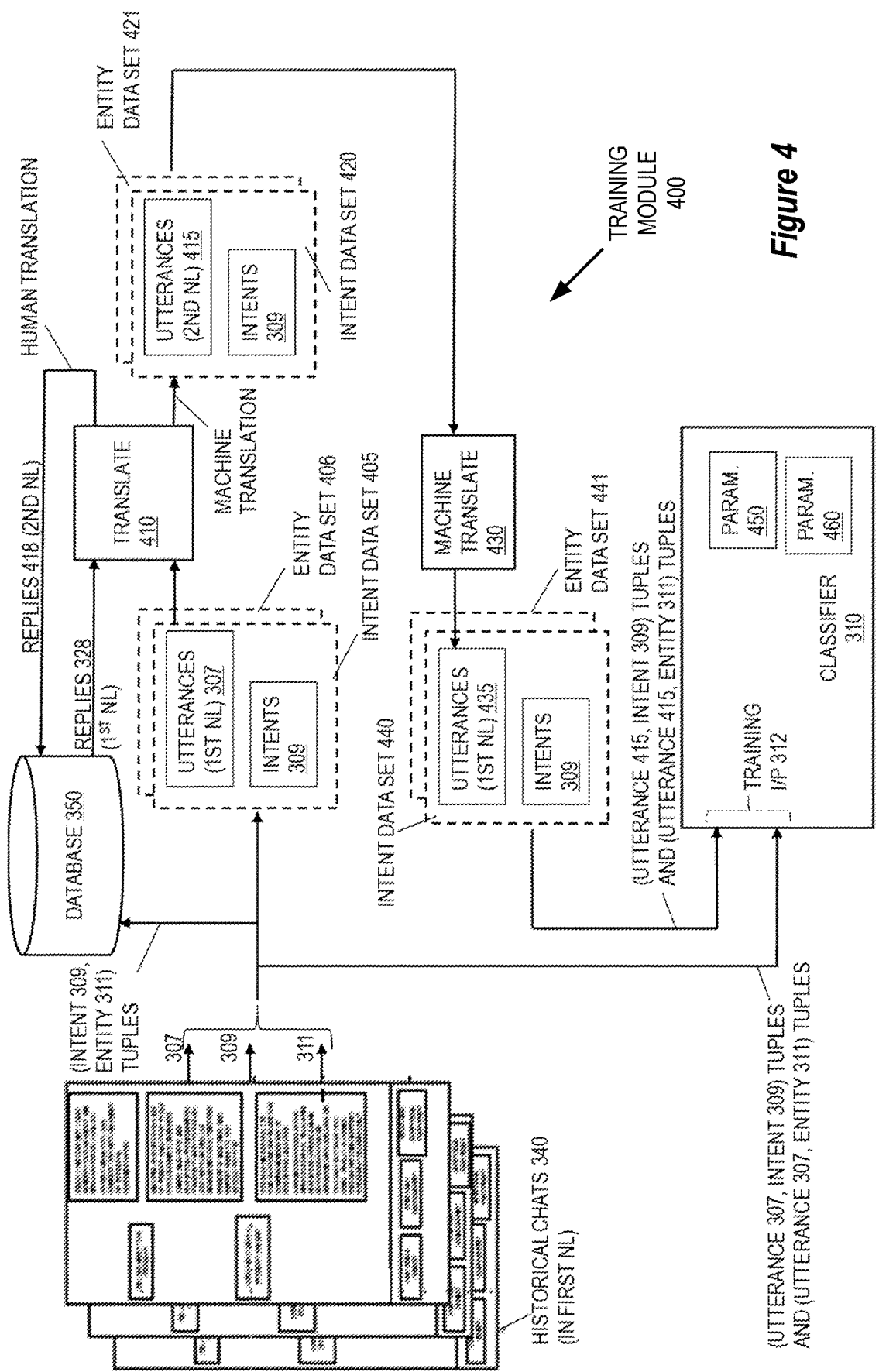
FIG. 4 illustrates additional aspects of a chat bot of the foregoing Figures, particularly with regard to training the chat bot, according to embodiments of the present invention.

Referring now to FIG. 4, an arrangement is shown for training chat bot 300 of FIG. 3, where a classifier 310 thereof that is initially trained in a first natural language is further trained for deploying to use chat bot 300 in a second natural language, according to an embodiment of the present invention. Initially, a first set of stored historical utterances 307 in the first natural language (e.g., English) is manually (human) tagged with corresponding historical intents 308 and entities 309, wherein solely utterances 307, intents 308 and entities 309 are used as original training source 401 input 312 to train classifier 310 for the first natural language. This initial training is shown in both FIGS. 3 and 4, although the (utterance 307, intent 309) tuples are explicitly shown in FIG. 4 as a first set 405 of intent training data, and (utterance 307, entity 311) tuples are shown in FIG. 4 as a first set 406 of entity training data. (Training data may also be referred to herein as "sample" data.) Training module 400 stores data sets 405 and 406 in a computer readable storage media and provides them as input 312 to train classifier 310 for the first natural language. This generates first classifier 310 parameters 450 determined solely from the original training source, i.e., intent data set 405 and entity data set 406. (The training may be on set 405 and 406 or respective classifiers may be trained on respective sets 405 and 406, according to embodiments of the present invention.)

FIG. 4 further shows that training module 400 machine translates 410 historical utterances 307 of intent data set 405 and stores corresponding utterances 415, which are in the second natural language, paired with corresponding intents 309 as intermediate intent data set 420. Likewise, training module 400 machine translates 410 historical utterances 307 of the entity data set 406 and stores corresponding utterances 415, which are in the second natural language, paired with corresponding entities 311 as intermediate entity data set 421.

As shown, training module 400 then machine translates 430 utterances 415 of intent data set 420 to generate utterances 435 back in the first natural language and stores them with their corresponding intents 309 as a second set 440 of intent training data having (utterance 435, intent 309) tuples in the first natural language, which module 400 provides as further input 312 to further train classifier 310 in the first natural language. Likewise, training module 400 machine translates 430 utterances 415 of entity data set 421 to generate utterances 435 back in the first natural language and stores them with their corresponding entities 311 as a second set 441 of entity training data having (utterance 435, entity 311) tuples in the first natural language, which module 400 provides as further input 312 to further train classifier 310 in the first natural language. This generates second classifier 310 parameters 460 determined both from the original training source, i.e., intent data set 405 and entity data set 406, and the machine back-translated source, i.e., intent data set 440 and entity data set 441.

The two rounds of machine translation 410 and 430 that created intent data set 440 and entity data set 441 generate some inaccuracies in utterances 435 relative to original utterances 307. Consequently, this arrangement for generating classifier parameters 460 seems contrary to logic, particularly for supervised training such as this, in which humans have analyzed utterances 307 of the original training data 405 and 406 and have tagged the historic utterances 307 with their corresponding intents 309 and entities 311. Nevertheless, the second sets 440 and 441 of training data in the first natural language, which have relatively inaccurate, machine translated 410 and 430 versions of utterances 307, are used by module 400 to further train classifier 310, thereby generating second classifier 310 parameters 460 for intent and entity classifying. (In other embodiments of the present invention, the training may alternatively be performed initially on all sets 405, 406, 440 and 441 or, in another alternative, initially on sets 405 and 440 for one classifier and initially on sets 406 and 441 for another.)

As previously mentioned for the chat bot 300 of FIG. 3, when chat bot 300 was initially trained in the first language, replies 328 (in the first natural language) were stored in database 350, where each reply is associated with a corresponding intent 318 and may also be associated with an entity 319. For deploying to use chat bot 300 in the second natural language, training module 400 prompts a user to manually translate replies 328 to provide corresponding replies 418 in the second language, as shown in FIG. 4, whereupon module 400 stores the translated replies 418 in database 350, so that responsive to a user 335 speaking in the second natural language, replies 418 in the second natural language are retrieved in response to (intent 308, entity 309) tuples and provided to user 335 instead of replies 328 in the first natural language. When the number of replies 328 is manageable, human translation 410 of replies 328 may be preferred, since it is more accurate. However, machine translation 410 of replies 328 is possible in an alternative embodiment.

Figure 5:
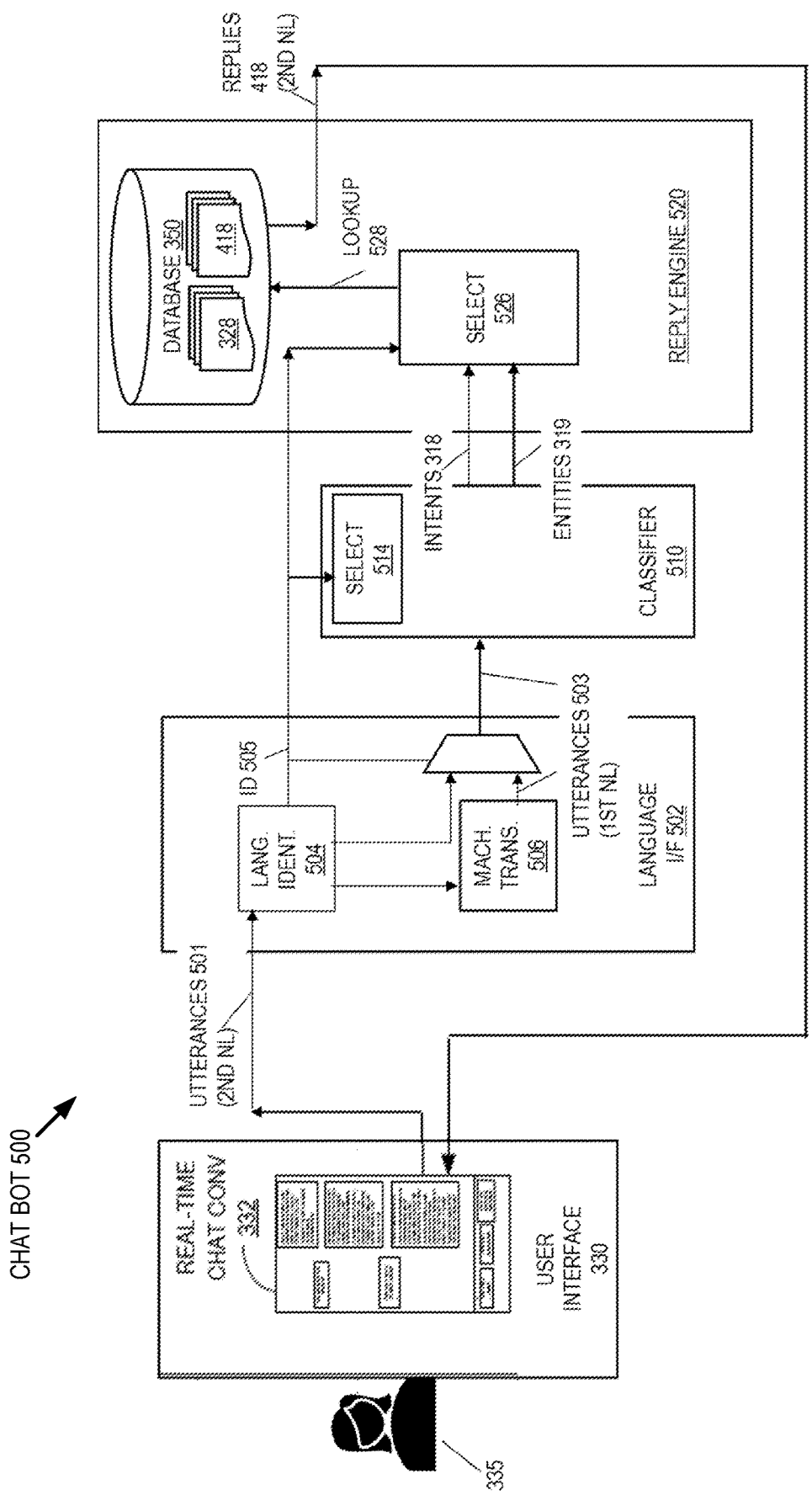
FIG. 5 illustrates additional aspects of a chat bot of the foregoing Figures, particularly with regard to operating the chat bot in a real time chat with a user, according to embodiments of the present invention.

Referring now to FIG. 5, a deployed arrangement is shown for a chat bot 500 trained in the manner of chat bot 300 in FIG. 4, according to an embodiment of the present invention. Chat bot 500 is shown in FIG. 5 responding to real time, second natural language, user utterances 505, by real time machine translating 506 of utterances 501 to first natural language utterances 503 before inputting them to classifier 510, which is trained like classifier 310 as shown in, and described for, FIG. 4. Surprisingly, testing has shown that with this arrangement—even though the additional training is with twice machine translated, utterances 435 (FIG. 4), which introduces some translation inaccuracy—intention and entity classification of real time machine translated utterances 503 performs much better than the known arrangement described herein above, i.e., the known arrangement in which real time machine translation is used without first performing the additional training described for FIG. 4 herein.

As previously stated, chat bot 500 is trained in the manner of chat bot 300 of FIGS. 3 and 4. Chat bot 500 also includes modifications, as shown in FIG. 5. Specifically, chat bot 500 includes a language interface 502, which includes language identification module 504 configured to receive utterances 501 from user 335 and generate a notification 505 indicating the natural language of utterances 501. In the illustrated instance of FIG. 5, utterances 501 are in the second natural language of FIG. 4. This contrasts with the source utterances for training chat bot 500, which were historical utterances 307 in first natural language.

As configured in the embodiment illustrated in FIG. 5, language interface 502 includes a machine translation module 516. Responsive to detecting that utterances 501 are in the second natural language, language identification module 504 passes user 335 utterances 501 from user interface 330 to machine translation module 506, which responsively translates utterances 501 from the second natural language to the first natural language and passes the translation as utterances 503 in the first natural language to classifier 510, as shown in the illustrated instance. (In an instance unlike the one illustrated in FIG. 5, in which language identification module 504 detects that utterances 501 are in the first natural language, language identification module 504 passes utterances 501 directly to classifier 510 without translation by machine translator 506.)

Notification 505 is also passed to select logic 514 of classifier 510, to indicate whether classifier 510 is receiving, from language interface 502, machine translated utterances 503 (which means utterances 501 are in the second natural language, as shown in the illustrated instance) or untranslated utterances 501 (which means utterances 501 are in the first natural language, unlike what is shown in the illustrated instance). Responsive to notification 505 indicating classifier 510 is receiving machine translated utterances 503, classifier 510 logic 514 selects to classify utterances 503 as intents 318 and entities 319 by applying classifier parameters 460 determined from both original training source (intent data set 405 and entity data set 406 of FIG. 4) and translated training source (intent data set 440 and entity data set 441 of FIG. 4). In an instance in which notification 505 indicates classifier 510 is receiving untranslated utterances 501, unlike the instance illustrated in FIG. 5, classifier 510 logic 514 responsively selects to classify utterances 503 as intents 318 and entities 319 by applying only classifier parameters 450 determined solely from original training source (intent data set 405 and entity data set 406 of FIG. 4).

In chat bot 500, modified select logic 322 of chat bot 300 is provided as select logic 526, which is configured to also receive notification 505 from language identification module 504, wherein in response to notification 505 indicating that utterances 501 are in the second natural language, as in the illustrated instance of FIG. 5, select logic 526 configures lookup 528 to retrieve replies 418 from database 350 responsive to intents 318 and entities 319 received from classifier 510, where replies 418 are in the second natural language as described for FIG. 4. Accordingly, reply engine 520 provides replies 418 to user 335 via interface 330 in response to utterances 501 in the second natural language. In an instance unlike that of FIG. 5, in which notification 505 indicates that utterances 501 are in the first natural language, select logic 526 configures lookup 528 to retrieve replies 328 from database 350 responsive to intents 318 and entities 319 received from classifier 510, where replies 328 are in the first natural language as described for FIG. 3. Accordingly, reply engine 520 provides replies 328 to user 335 via interface 330 in response to utterances 501 in the first natural language.

Figure 6:
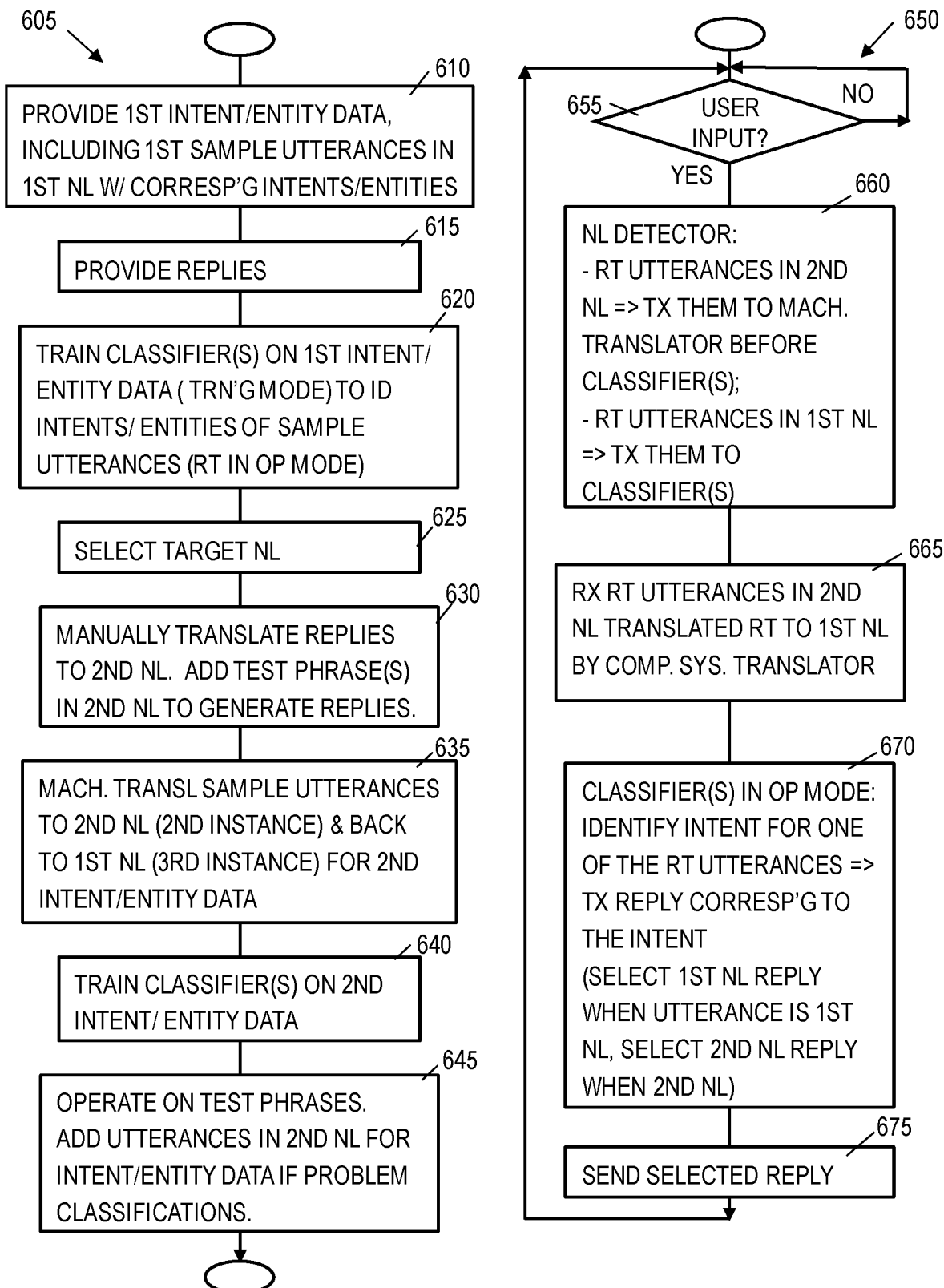
FIG. 6 illustrates aspects of a method performed by a chat bot of the foregoing Figures, according to an embodiment of the present invention.

Referring now to FIG. 6, a chat bot training process 605 and a chat bot operating process 650 are illustrated in a flow chart, for an example in which English is the first natural language. In training process 605, first intent data is provided at 610, including a first instance of intent-related sample utterances in a first natural language and intents corresponding to the respective sample utterances. Likewise, first entity data is provided at 610, including a first instance of entity-related sample utterances in a first natural language and entities corresponding to the respective entity-related sample utterances. (It should be understood that in some instances a single utterance may be both intent-related and entity-related. In other instances, an utterance may indicate an underlying intent, but not an underlying entity or vice versa.) At 615, replies corresponding to the respective intents or entities (or corresponding to both) of the sample utterances are provided and stored for the chat bot to send users, i.e., to send later in response to respective user utterances.

At 620, an intent classifier of the chat bot is trained on the first intent data in a training mode. The training configures the classifier so that it will identify intents corresponding to respective intent-related user utterances in real time when the classifier receives the utterances and is in an operating mode. Likewise, an entity classifier of the chat bot is trained on the first entity data in a training mode. The training configures the classifier so that it will identify entities corresponding to respective entity-related user utterances in real time when the classifier receives the utterances and is in an operating mode. (In an embodiment of the present invention, a single classifier may be trained on intent data and on entity data, so that it identifies both intents and entities. It should also be appreciated that even in an embodiment in which one classifier is trained to recognize intents and another one is trained to recognize entities, each one receives all utterances when in the operating mode, so that they may be considered a single classifier that recognizes both entities and intents. Herein, references to an "intent classifier" and references to a "entity classifier" may refer to the same classifier identifying intents and identifying entities.)

At 625, a user selects a target natural language (i.e., "second natural language") for deploying a first natural language trained chat bot (English language, for example). At 630, the user is prompted to manually translate each individual English reply (e.g., reply 328 in FIG. 3) into the target natural language reply (e.g., reply 418 in FIG. 4).Also, the user is prompted to add one or more test phrases in the target natural language that will generate respective replies 418.

At 635, intent data utterances are machine-translated to the target natural language, which provides a second instance of the intent-related utterances, and then machine-translated back to English, which provides a third instance. The third instance of the sample intent-related utterances and their corresponding intents provide second intent data for training. Likewise, at 635, entity data utterances are machine-translated to target natural language, which provides a second instance of the entity-related utterances, and then machine-translated back to English, which provides a third instance of the entity-related utterances. The third instance of the sample entity-related utterances and their corresponding entities provide second entity data for training. At 640, the English training data from 635 is appended to the original data set(s), and classifier(s) is(are) retrained.

At 645, as part of training, the user identifies gaps by operating trained chat bot on test data in the target language and adds additional target natural language utterances for intent or entity data to address any problematic intent or entity classification identified. (Note: the user does not need to manually translate the vast bulk of original intent and entity data.) If such data is added, then at 645 the data is also machine-translated back into English, appended to the English training data and the classifier(s) is(are) retrained.

In operation, chat bot operating process 650 waits at 655 for user input. Natural language of input received 655 (in an illustrated instance, an utterance in the second natural language) is processed 660 by a natural language (NL) detector, wherein i) when the detector determines the utterance is in the second natural language (i.e., not the language for which the chat bot classifier is trained), NL detector transmits the utterance to a machine translator (e.g., computer system module) for translating in real time, which transmits the translated utterance (in the first natural language), in turn, to the classifier and ii) when the utterance is in the second natural language, NL detector determines this and transmits the utterance directly to the classifier instead of the machine translator.

At 665, in the illustrated instance in which the utterance from the user at the user interface is in the second natural language, the classifier receives the translated utterance in the first natural language real time from the computer system translator. (Otherwise, responsive to the utterance being in the first natural language from the user at the user interface, the classifier receives the untranslated utterance.)

At 670 the classifier responsively identifies an underlying intent corresponding to the utterance and, if the utterance also indicates an entity, also identifies an entity for the utterance. Also at 670, the reply engine selects a reply corresponding to the identified intent (and the entity, if applicable) for the received real time utterance, wherein in response to the natural language detector detecting that the real time utterance from the user at the user interface is in the second natural language, the reply engine selects the reply from the second instance of the stored replies. (Otherwise, in response to the natural language detector detecting that the real time utterance from the user at the user interface is in the first natural language, the reply engine selects the reply from the first instance of the stored replies.) At 675, the reply engine sends the selected reply to the user via the user interface.

In one example use case, an English language SPSS statistics chat bot was adapted into German, with German as an instance of a foreign language and SPSS Statistics as an instance of a knowledge domain. This was done by beginning with the English Language SPSS statistics chat bot and passing intent data to a Watson Translator API, which returned a German translation of the intent data. This German translation was then passed back into the Watson Translator API to receive a translated English intent dataset. At this point, both the translated English and the original English intent data sets were passed to Watson Assistant for training. This process was repeated with entity data as well. This resulted in a chat bot much better trained to answer German utterances machine translated into English in real time. This approach can be applied to any second natural language for any pre-existing, first natural language chat bot.

Once the chat bot is adapted to handle SPSS statistics questions in German, a translation wrapper is implemented as shown in FIG. 5, so that customers can ask questions and receive responses in German. The wrapper may use Watson Translator to first verify that the inbound utterance is in German and if confirmed, to translate the utterance into English. The translated utterance is passed to the adapted chat bot, which responds with the appropriate German. In implementation, this arrangement has demonstrated more than 95% accurate on German test cases hand-translated into English and then submitted to an English language chat bot trained as indicated in FIG. 4 herein and operated as indicated in FIG. 5.

The following table provides examples of sample utterances originally in English, their corresponding intent tags, corresponding utterances by a German speaker and results from machine translating the utterances to German and back to English. In an embodiment of the present invention, training on machine translations is done on both normal and lowercase utterances. That is, for lowercase (indicated as such herein below), all text of utterances is converted to lowercase before performing machine translations. The following examples include machine back-translations on both normal and lowercase English language sample utterances. The examples are designated as follows:

Sample data: Utterance by English speaker ("Utterance") 5
Sample data: Intent ("Label")
Corresponding utterance by German speaker ("Utterance_de")
Machine back-translation of English sample utterance ("Utterance_de_en") 10
Machine back-translation of lowercase English sample utterance
("Utterance_de_en_lowercase")

TABLE

"Utterance": "can you provide me with more resources or contacts?",
"Label": "Contact Method",
"Utterance_de": "k\u00f6nnen Sie mir mehr Ressourcen oder Kontakte zur Verf\u00fcgung stellen?",
"Utterance_de_en": "Can you make more resources or contacts available to me?",
"Utterance_de_en_lowercase": "they can give me more resources or contacts to dispose of"
"Utterance": "what type of data does <product> handle?",
"Label": "FeaturesTraining",
"Utterance_de": "Welche Art von Daten verarbeitet <product>?",
"Utterance_de_en": "What type of data is <product>?",
"Utterance_de_en lowercase": "which type of data is processed product"
"Utterance": "does cognitive have vision skills as well?",
"Label": "Use Case",
"Utterance_de": "hat kognitive F\u00e4higkeiten auch Sehf\u00e4higkeiten?",
"Utterance_de_en": "cognitive abilities also have visual abilities?",
"Utterance_de_en_lowercase": "cognitive abilities also have visual abilities"
"Utterance": "sorry the site seems to be not working.",
"Label": "TroubleshootingWeb Support",
"Utterance_de": "Es tut mir leid, dass die Website nicht funktioniert.",
"Utterance_de_en": "I'm sorry the website doesn't work.",
"Utterance_de_en_lowercase": "I m sorry that the website does not work"
"Utterance": "i clicked that link but it doesn't lead to the purchase page.",
"Label": "TroubleshootingWeb Support",
"Utterance_de": "Ich klickte diesen Link, aber es f\u00fchrt nicht zur Kaufseite.",
"Utterance_de_en": "I clicked this link, but it doesn't lead to the purchase page.",
"Utterance_de_en_lowercase": "I clicked this link but it does not lead to the buy page"

Note that while this method still relies on human translation, its ability to automatically generate the intent and entity data removes the largest time blocker in chat bot creation. Natural language classifiers require large hand-tagged data sets in order to accurately predict the label. The disclosed arrangement method creates quality customer-facing foreign language chat bots without spending weeks to months building or using foreign language resources. Alternatively, simply translating the input and output yields poorly translated results. The arrangement disclosed herein maintains a necessary level of accuracy while creating an accelerated pipeline.

It is to be understood that although this disclosure includes the following detailed description of cloud computing, implementation of the teachings recited herein are not limited to a cloud computing environment. Rather, embodiments of the present invention are capable of being implemented in conjunction with any other type of computing environment now known or later developed.

A cloud computing model of service delivery may include at least five characteristics, at least three service models, and at least four deployment models.

Characteristics for a cloud computing model are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models for cloud computing are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models for cloud computing are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling computing resources.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
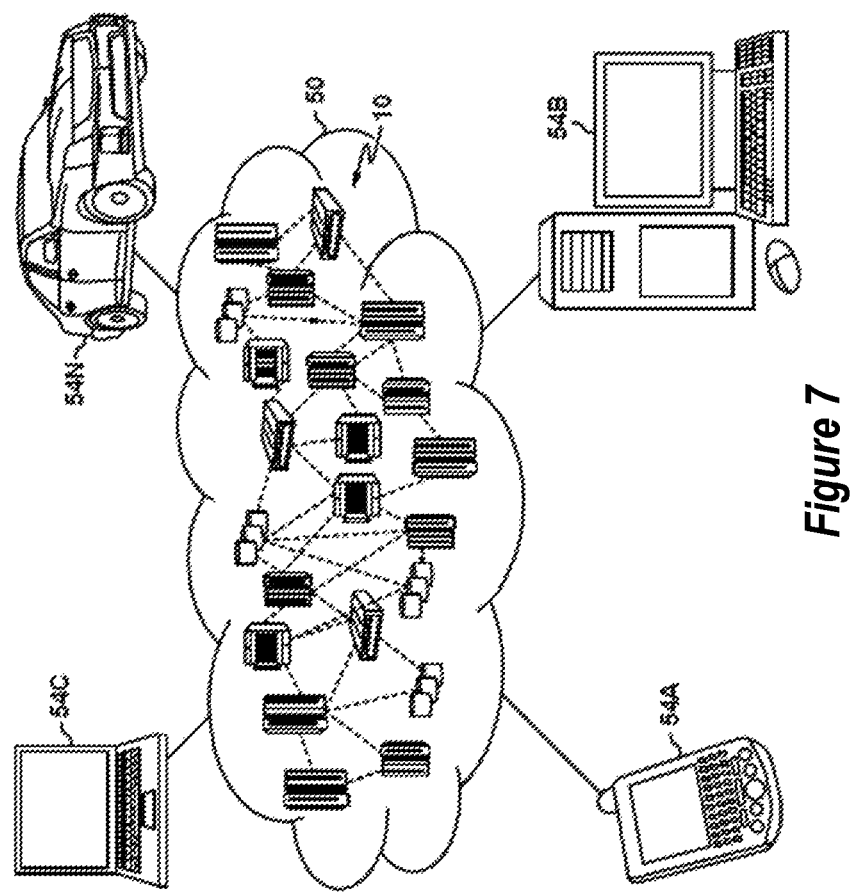
FIG. 7 depicts a cloud type of computing resource environment for the chat bot of the foregoing Figures, according to embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
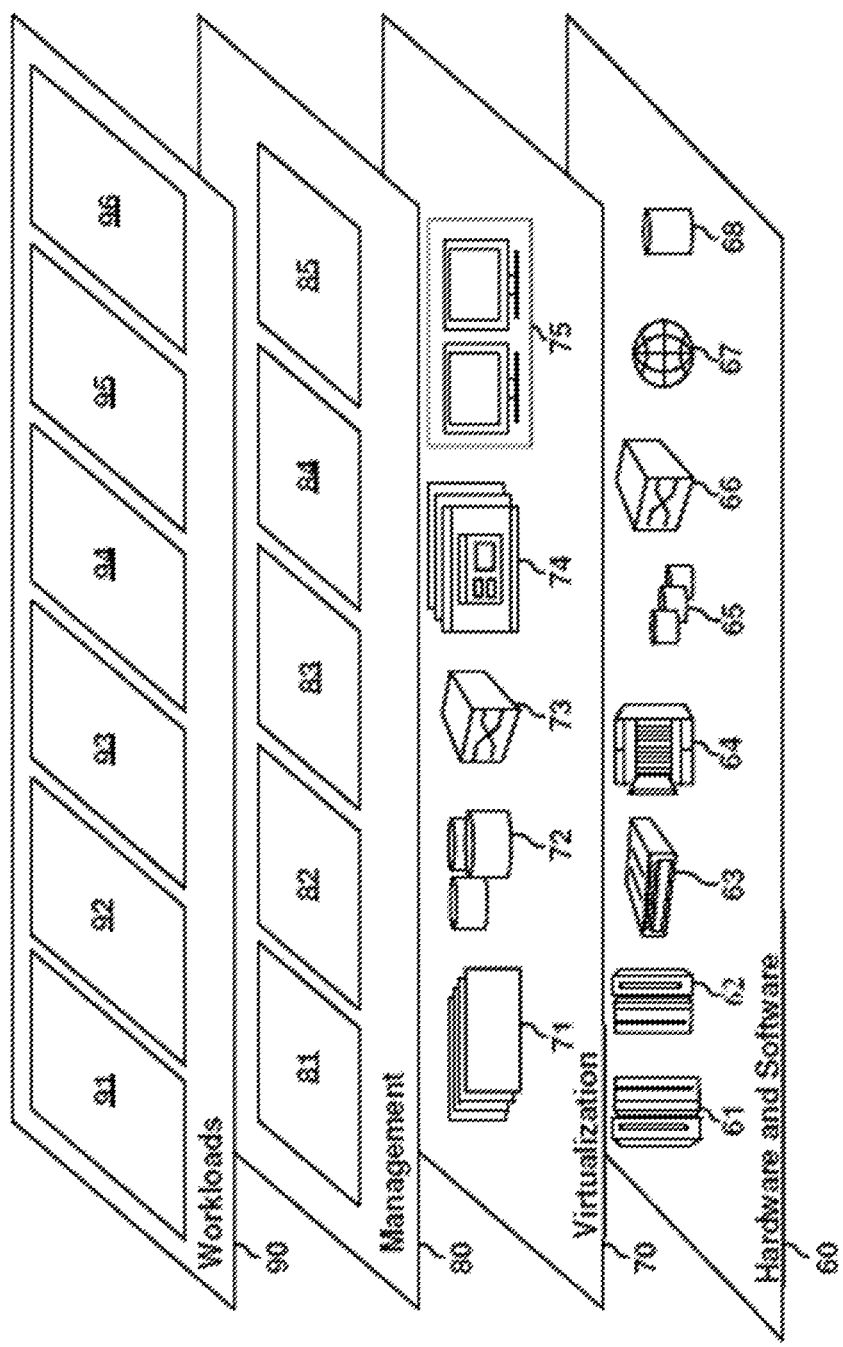
FIG. 8 depicts abstraction model layers applicable to a cloud type of computing resource model for the chat bot of the foregoing Figures, according to embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91, software development and lifecycle management 92, virtual classroom education delivery 93, data analytics processing 94, transaction processing 95, and providing computing resources to a user 96. One or more of these workloads may include workloads for chat bots as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Likewise, the actions recited in the claims can be performed in a different order and still achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, no element described herein is required for the practice of the invention unless expressly described as essential or critical.

The corresponding structures, materials, acts, and equivalents of all means or step plus function elements in the claims below are intended to include any structure, material, or act for performing the function in combination with other claimed elements as specifically claimed.

It should be appreciated that the particular implementations shown and described herein are illustrative of the invention and its best mode and are not intended to otherwise limit the scope of the present invention in any way. Other variations are within the scope of the following claims. Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description but is not intended to be exhaustive or limited to the invention in the form disclosed.

What is claimed is:

1. A computer system implemented method for a chat bat comprising:
    providing first intent data including a first instance of sample utterances in a first natural language and intents corresponding to the respective sample utterances;
    translating the sample utterances by a computer system to a second natural language as a second instance of the sample utterances;
    translating the sample utterances of the second instance by a computer system back to the first natural language as a third instance of the sample utterances;
    providing second intent data including the third instance of the sample utterances and the corresponding intents;
    training an intent classifier of the chat bot in the first natural language on both the first and second intent data to identify respective intents of real time utterances received by the intent classifier in the first natural language from a user when the chat bot is in an operating mode, so that the training includes training the intent classifier on not only on the first instance of the sample utterances in the first natural language but also on the third instance of the sample utterances that has been provided by computer translation of the first instance of the sample utterances to the second natural language in the second instance and by computer translation of the second instance of the sample utterances in the second natural language back to the first natural language;
    receiving a real time utterance instance by the chat bot in the operating mode, wherein the instance is in the second natural language; and
    selecting, responsive to a natural language detector detecting the received instance is in the second natural language, to do the following:
        send the received instance to a computer system translator before the intent classifier;
        receive from the computer system translator a first natural language translation of the received instance; and
        send the first natural language translation to the intent classifier.

2. The method of claim 1 comprising:
    providing, for the chat bot to send users, replies corresponding to the respective intents of the sample utterances, including a first instance of the replies in the first natural language and a second instance of the replies in the second natural language.

3. The method of claim 1 comprising:
receiving by the chat bot in the operating mode a real time utterance instance in the first natural language;
selecting, responsive to the natural language detector detecting the received instance in the first natural language, to send the received first natural language instance to the intent classifier instead of the computer system translator.

4. The method of claim 3 comprising:
identifying, by the intent classifier when the chat bot is in the operating mode, an intent for one of the received real time utterances;
sending a reply corresponding to the identified intent for the one of the received real time utterances, wherein in response to the natural language detector detecting that the one of the received real time utterances is in the first natural language, the reply that is sent is from the first instance of the replies and in response to the natural language detector detecting that the one of the received real time utterances is in the second natural language, the reply that is sent is from the second instance of the replies.

5. The method of claim 1, wherein training the intent classifier on the first and second intent data comprises:
performing the training on the first intent data to enable the intent classifier to identify respective intents of the real time utterances in the first natural language;
wherein the method includes, after performing the training on the first intent data:
modifying the intent classifier by performing the training on the second intent data, wherein the modifying enables the intent classifier to identify respective intents for instances of the real time utterances translated by a computer system translator from the second natural language.

6. The method of claim 1, comprising:
providing first entity data including a first instance of entity-related sample utterances in a first natural language and entities corresponding to the respective entity-related sample utterances;
translating the entity-related sample utterances by a computer system to a second natural language as a second instance of the entity-related sample utterances;
translating the second instance of the entity related sample utterances by a computer system back to the first natural language as a third instance of the entity-related sample utterances;
providing second entity data including the third instance of the entity-related sample utterances and the corresponding entities; and
training an entity classifier of the chat bot to identify respective entities of the real time utterances, wherein the identifying is responsive to the entity classifier receiving the real time utterances from the user when the chat bot is in the operating mode and the training includes training the entity classifier on the first and second entity data.

7. A system for a chat bot comprising:
a processor; and
a computer readable storage medium connected to the processor, wherein the computer readable storage medium has stored thereon a program for controlling the processor, and wherein the processor is operative with the program to execute the program for:
providing first intent data including a first instance of sample utterances in a first natural language and intents corresponding to the respective sample utterances;
translating the sample utterances by a computer system to a second natural language as a second instance of the sample utterances;
translating the sample utterances of the second instance by a computer system back to the first natural language as a third instance of the sample utterances;
providing second intent data including the third instance of the sample utterances and the corresponding intents;
training an intent classifier of the chat bot in the first natural language on both the first and second intent data to identify respective intents of real time utterances received by the intent classifier in the first natural language from a user when the chat bot is in an operating mode, so that the training includes training the intent classifier on not only on the first instance of the sample utterances in the first natural language but also on the third instance of the sample utterances that has been provided by computer translation of the first instance of the sample utterances to the second natural language in the second instance and by computer translation of the second instance of the sample utterances in the second natural language back to the first natural language;
receiving a real time utterance instance by the chat bot in the operating mode, wherein the instance is in the second natural language; and
selecting, responsive to a natural language detector detecting the received instance is in the second natural language, to do the following:
send the received instance to a computer system translator before the intent classifier;
receive from the computer system translator a first natural language translation of the received instance; and
send the first natural language translation to the intent classifier.

8. The system of claim 7 wherein the processor is operative with the program to execute the program for:
providing, for the chat bot to send users, replies corresponding to the respective intents of the sample utterances, including a first instance of the replies in the first natural language and a second instance of the replies in the second natural language.

9. The system of claim 7 wherein the processor is operative with the program to execute the program for:
receiving by the chat bot in the operating mode a real time utterance instance in the first natural language;
selecting, responsive to the natural language detector detecting the received instance in the first natural language, to send the received first natural language instance to the intent classifier instead of the computer system translator.

10. The system of claim 9 wherein the processor is operative with the program to execute the program for:
identifying, by the intent classifier when the chat bot is in the operating mode, an intent for one of the received real time utterances;
sending a reply corresponding to the identified intent for the one of the received real time utterances, wherein in response to the natural language detector detecting that the one of the received real time utterances is in the first natural language, the reply that is sent is from the first instance of the replies and in response to the natural language detector detecting that the one of the received real time utterances is in the second natural language, the reply that is sent is from the second instance of the replies.

11. The system of claim 7, wherein training the intent classifier on the first and second intent data comprises:
performing the training on the first intent data to enable the intent classifier to identify respective intents of the real time utterances in the first natural language;
wherein the method includes, after performing the training on the first intent data:
modifying the intent classifier by performing the training on the second intent data, wherein the modifying enables the intent classifier to identify respective intents for instances of the real time utterances translated by a computer system translator from the second natural language.

12. The system of claim 7, wherein the processor is operative with the program to execute the program for:
providing first entity data including a first instance of entity-related sample utterances in a first natural language and entities corresponding to the respective entity-related sample utterances;
translating the entity-related sample utterances by a computer system to a second natural language as a second instance of the entity-related sample utterances;
translating the second instance of the entity related sample utterances by a computer system back to the first natural language as a third instance of the entity-related sample utterances;
providing second entity data including the third instance of the entity-related sample utterances and the corresponding entities; and
training an entity classifier of the chat bot to identify respective entities of the real time utterances, wherein the identifying is responsive to the entity classifier receiving the real time utterances from the user when the chat bot is in the operating mode and the training includes training the entity classifier on the first and second entity data.

13. A computer program product for a chat bot including a computer readable storage medium having instructions stored thereon for execution by a computer system, wherein the instructions, when executed by the computer system, cause the computer system to implement a method comprising:
providing first intent data including a first instance of sample utterances in a first natural language and intents corresponding to the respective sample utterances;
translating the sample utterances by a computer system to a second natural language as a second instance of the sample utterances;
translating the sample utterances of the second instance by a computer system back to the first natural language as a third instance of the sample utterances;
providing second intent data including the third instance of the sample utterances and the corresponding intents;
training an intent classifier of the chat bot in the first natural language on both the first and second intent data to identify respective intents of real time utterances received by the intent classifier in the first natural language from a user when the chat bot is in an operating mode, so that the training includes training the intent classifier on not only on the first instance of the sample utterances in the first natural language but also on the third instance of the sample utterances that has been provided by computer translation of the first instance of the sample utterances to the second natural language in the second instance and by computer translation of the second instance of the sample utterances in the second natural language back to the first natural language;
receiving a real time utterance instance by the chat bot in the operating mode, wherein the instance is in the second natural language; and
selecting, responsive to a natural language detector detecting the received instance is in the second natural language, to do the following:
send the received instance to a computer system translator before the intent classifier;
receive from the computer system translator a first natural language translation of the received instance; and
send the first natural language translation to the intent classifier.

14. The computer program product of claim 13 wherein the instructions, when executed by the computer system, cause the computer system to implement a method comprising:
providing, for the chat bot to send users, replies corresponding to the respective intents of the sample utterances, including a first instance of the replies in the first natural language and a second instance of the replies in the second natural language.

15. The computer program product of claim 13 wherein the instructions, when executed by the computer system, cause the computer system to implement a method comprising:
receiving by the chat bot in the operating mode a real time utterance instance in the first natural language;
selecting, responsive to the natural language detector detecting the received instance in the first natural language, to send the received first natural language instance to the intent classifier instead of the computer system translator.

16. The computer program product of claim 15 wherein the instructions, when executed by the computer system, cause the computer system to implement a method comprising:
identifying, by the intent classifier when the chat bot is in the operating mode, an intent for one of the received real time utterances;
sending a reply corresponding to the identified intent for the one of the received real time utterances, wherein in response to the natural language detector detecting that the one of the received real time utterances is in the first natural language, the reply that is sent is from the first instance of the replies and in response to the natural language detector detecting that the one of the received real time utterances is in the second natural language, the reply that is sent is from the second instance of the replies.

17. The computer program product of claim 13, wherein training the intent classifier on the first and second intent data comprises:
performing the training on the first intent data to enable the intent classifier to identify respective intents of the real time utterances in the first natural language;
wherein the method includes, after performing the training on the first intent data:
modifying the intent classifier by performing the training on the second intent data, wherein the modifying enables the intent classifier to identify respective intents for instances of the real time utterances translated by a computer system translator from the second natural language.

\* \* \* \* \*